United States Patent [19]

Hirasawa et al.

[11] 4,170,671
[45] Oct. 9, 1979

[54] METHOD FOR TREATMENT OF METAL SURFACE

[75] Inventors: Youji Hirasawa, Hirakata; Hisataka Yamamoto, Tokyo, both of Japan

[73] Assignee: Nippon Paint Co., Ltd., Osaka, Japan

[21] Appl. No.: 933,042

[22] Filed: Aug. 11, 1978

Related U.S. Application Data

[63] Continuation of Ser. No. 793,352, May 3, 1977, abandoned.

[51] Int. Cl.$^2$ .......................... B05D 1/18; B05D 3/02
[52] U.S. Cl. ............................. 427/388 C; 148/6.2; 427/435
[58] Field of Search .............. 148/6.2; 427/435, 388 C

[56] References Cited

U.S. PATENT DOCUMENTS

| | | | |
|---|---|---|---|
| 3,592,699 | 7/1971 | Steinbrecher et al. | 148/6.2 |
| 3,647,567 | 3/1972 | Schweri | 148/6.15 R |

*Primary Examiner*—Michael R. Lusignan
*Attorney, Agent, or Firm*—Wenderoth, Lind & Ponack

[57] ABSTRACT

A method for the treatment of a metal surface, which comprises applying a treating liquid comprising an emulsion and a water-soluble chromium compound containing 30 to 90% by weight of hexavalent chromium and optionally a water-insoluble white carbon to a metal surface and drying the resultant, said treating liquid containing substantially no alkali metal ion, said emulsion being prepared by emulsion-polymerizing α, β-monoethylenically unsaturated monomer in the presence of an emulsifier selected from the group consisting of a polyacrylic acid and a copolymer of acrylic acid and a monomer selected from the group consisting of methacrylic acid, an acrylamide, a methacrylamide and a hydrophilic monomer of the formula:

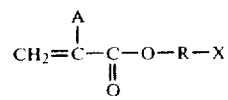

wherein A is hydrogen atom or methyl; R is a substituted or unsubstituted alkylene having 2 to 4 carbon atoms; and X is a functional group containing at least one of oxygen atom, phosphorus atom and sulfur atom, said emulsifier being used in an amount of 20 parts by weight or more (in the solid content) to 100 parts by weight of the α,β-monoethylenically unsaturated monomer.

14 Claims, No Drawings

METHOD FOR TREATMENT OF METAL SURFACE

This is a continuation of application Ser. No. 793,352, filed May 3, 1977, abandoned.

The present invention relates to a method for the treatment of a metal surface for the purpose of preparing it to receive a coating finish. More particularly, it relates to a method for the treatment of a metal surface with comprises applying a treating liquid comprising (a) an emulsion prepared by emulsion-polymerizing an α,β-monoethylenically unsaturated monomer in the presence of a specific water-soluble polymer as an emulsifier and (b) a water-soluble chromium compound containing trivalent and hexavalent chromium and optionally (c) a water-insoluble white carbon, said treating liquid containing substantially no alkali metal ion.

The treatment of a metal surface for the purpose of preparing it to receive a coating finish, i.e. the primary treatment of a metal surface, is essential in order to improve the corrosion resistance thereof and the adhesion of the coating film subsequently applied thereto. The conventional methods of the treatment of a metal surface are chemical conversion treatments such as a zinc phosphate conversion treatment or an iron phosphate conversion treatment or a chromate treatment, which are so-called chemical conversion type coating film methods wherein the coating film is formed by the reaction of the treating liquid and the metal. In these methods, it is required to remove the unreacted treating liquid and reaction by-products by washing the metal thus treated after the film-forming reaction.

The chemical conversion treatment of the surface of metals, such as iron, galvanized steel, aluminum, or the like are usually carried out in the following steps:

degreasing→rinsing with water→rinsing with water or surface preparation→chemical conversion treatment→washing with water→after-treatment with diluted chromium compound aqueous solution→drying.

According to this method, however, in order to proceed with the film-forming reaction having high quality, it is necessary to strictly control each step, for instance, the temperature and concentration of the components (e.g. free acids, total acidity, zinc, etc.) in the degreasing bath and the conversion coating treating bath, or the like, to constantly remove the sludges deposited in the baths during the treatment for a long time, to make the nozzle or other devices clean, and further, to remove a large amount of the waste water which is drained in the washing with water after the convention coating treatment. Moreover, it is occasionally required to abandon the baths wherein a large amount of nitrate ion, sodium ion, chloride ion or the like is accumulated.

For eliminating these defects in the above-mentioned chemical conversion type coating film forming methods, there have been proposed some film forming methods comprising coating the metal surface with a treating liquid comprising an emulsion prepared by emulsion-polymerizing an α,β-monoethylenically unsaturated monomer and a water-soluble chromium compound (Japanese Patent Laid Open Publication (without examination) No. 57931/1975 and Japanese Patent Publication Nos. 31026/1974, 40865/1974 and 1889/1975). However, the above-mentioned defects are not necessarily sufficiently eliminated even by these methods. That is, the most important point in the above film forming method using an emulsion is that the emulsion should be chemically stable. From this viewpoint, a nonionic surfactant or an anionic surfactant is used for stabilizing the emulsion in these known methods (Japanese Patent Laid Open Publication (without examination) No. 57931/1975 and Japanese Patent Publication Nos. 40865/1974 and 1889/1975), but it results in a significant deterioration of the adhesion, corrosion resistance and moisture resistance of the coating film subsequently applied onto the metal. Moreover, the method described in Japanese Patent Publication No. 31026/1974 requires to cool the treating liquid at a temperature of lower than 20° C. in order to prevent the deterioration of the resin which occurs when the emulsion is admixed with the chromium compound.

The present inventors have intensively studied to find an improved emulsion which can give a stable treating liquid without using any surfactant and any specific treatment, and it has been found that the desired emulsion can be prepared by emulsion-polymerizing the α,β-monoethylenically unsaturated monomer in the presence of a specific water-soluble polymer, and that the emulsion thus prepared can be admixed with the water-soluble chromium compound containing trivalent and hexavalent chromium without occurrence of undesirable destruction of emulsion, gelation or precipitates and can give an excellent stable treating liquid admixed with the water-soluble chromium compound and optionally with a water-insoluble white carbon which shows excellent adhesion, corrosion resistance and moisture resistance of the coating film subsequently applied thereto, and further that the treating liquid containing substantially no alkali metal ion can afford a painted metal having more improved corrosion resistance.

Furthermore, according to the method of metal surface treatment of the present invention, the desired coating film can be easily formed merely by supplementing intermittently the consumed amount of the treating liquid at a fixed period without the strict control of the steps, such as the rinsing with water, the treatment of the water and further the after-treatment of the metal as in the conventional chemical conversion type coating film forming method.

An object of the present invention is to provide an improved method for the treatment of a metal surface in order to prepare the metal surface to receive a coating finish.

Another object of the invention is to provide a treating liquid useful for the treatment of metal surface, which comprises a stable emulsion and a water-soluble chromium compound containing trivalent and hexavalent chromium and optionally a water-insoluble white carbon and contains substantially no alkali metal ion.

A further object of the invention is to provide an improved method for preparing the emulsion by emulsion-polymerizing an α,β-monoethylenically unsaturated monomer in the presence of a specific water-soluble polymer.

These and other objects of the present invention will be apparent from the following description.

The method of the treatment of a metal surface of the present invention comprises coating a treating liquid comprising (a) an emulsion prepared by emulsion-polymerizing an α,β-monoethylenically unsaturated monomer and (b) a water-soluble chromium compound containing 30 to 90% by weight of hexavalent chromium and also trivalent chromium and optionally (c) a water-insoluble white carbon and containing substantially no alkali metal ion, said emulsion being prepared by emulsion-polymerizing an α,β-monoethylenically unsaturated monomer in the presence of an emulsifier selected from a polyacrylic acid and a copolymer of acrylic acid and at least one monomer selected from the group consisting of methacrylic acid, acrylamide, methacrylamide and a hydrophilic monomer of the formula:

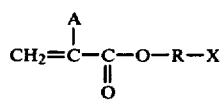

wherein A is hydrogen atom or methyl, R is a substituted or unsubstituted alkylene group having 2 to 4 carbon atoms and X is a functional group having at least one of oxygen atom, phosphorus atom and sulfur atom, said emulsifier being used in an amount of 20 parts by weight or more (in the solid content) to 100 parts by weight of the α,β-monoethylenically unsaturated monomer.

The emulsifier (i.e. the water-soluble polymer) is polyacrylic acid and a copolymer of acrylic acid and at least one compound selected from methacrylic acid, acrylamides (e.g. acrylamide and N-methylol-acrylamide), methacrylamides (e.g. methacrylamide and N-methylolmethacrylamide) and a hydrophilic monomer of the above formula (I) [specific examples of the monomers in the case where X is a functional group having oxygen atom are 2-hydroxyethyl acrylate, hydroxypropyl acrylate, 2-hydroxyethyl methacrylate, hydroxypropyl methacrylate, 3-hydroxybutyl acrylate, 2,2-bis(-hydroxymethyl)ethyl acrylate, 2,3-dihydroxypropyl methacrylate, 3-hydroxybutyl methacrylate, etc.; specific examples of the monomers in the case where X is a functional group having phosphorus atom are (a) mono(2-hydroxyethyl methacrylate) acid phosphate of the formula:

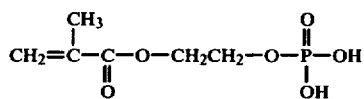

and (b) mono(3-chloro-2-hydroxypropyl methacrylate) acid phosphate of the formula:

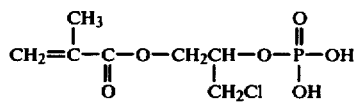

a specific example of the monomer in the case where X is a functional group having sulfur atoms is sulfonylethyl methacrylate, etc.] which is used alone or in a mixture of two or more thereof.

The proportion of the acrylic acid to the other hydrophilic monomer in the above copolymer may be appropriately selected so as to make the content of the acrylic acid in the whole monomer in the range of 50% by weight or more, preferably 60% by weight or more, from the viewpoint of the stability of the said emulsion, adhesion property to the metal substrate, etc.

Preparation of such water-soluble polymers may be carried out in accordance with conventional methods (e.g. polymerization in an aqueous solution, block polymerization, polymerization in an organic solvent, etc.)

For instance, in case of the polymerization in an aqueous solution, the polymerization may be carried out by adding dropwise simultaneously acrylic acid or a mixture of acrylic acid and at least one of the other hydrophilic monomers and water (preferably a deionized water) containing a water-soluble free radical catalyst other than an alkali metal salt (e.g. ammonium persulfate) from the separate dropping funnels to water (preferably a deionized water) which is kept at a temperature suitable for the reaction, and reacting the mixture with agitation at a temperature of 70° to 90° C. The reaction period of time including the time for dropping the reactants is usually 3 to 5 hours.

The α,β-monoethylenically unsaturated monomers used in the present invention include acrylic esters (e.g. methyl acrylate, ethyl acrylate, isopropyl acrylate, n-butyl acrylate, 2-ethylhexyl acrylate, decyl acrylate, isooctyl acrylate, 2-ethylbutyl acrylate, octyl acrylate, methoxyethyl acrylate, ethoxyethyl acrylate, 3-ethoxypropyl acrylate, etc.); methacrylic esters (e.g. methyl methacrylate, ethyl methacrylate, isopropyl methacrylate, n-butyl methacrylate, isobutyl methacrylate, n-hexyl methacrylate, lauryl methacrylate, decyl methacrylate, octyl methacrylate, stearyl methacrylate, 2-methylhexyl methacrylate, glycidyl methacrylate, 2-ethoxyethyl methacrylate, cetyl methacrylate, benzyl methacrylate, 3-methoxybutyl methacrylate, etc.); acrylonitrile; methacrylonitrile; vinyl acetate; vinyl chloride; vinyl ketone; vinyl-toluene; and styrene, which may be used alone or in a mixture of two or more thereof. In addition to these monomers, there may also be used a small amount of the monomers constituting the above water-soluble polymer, such as acrylamides, methacrylamides and the hydrophilic monomers of the above formula (I). Particularly, when a hydroxy group-containing monomer (e.g. 2-hydroxyethyl methacrylate) is added, the polymer has a structure crosslinked with the COOH group in the emulsion, and hence, the formed coating film can afford an extremely improved paint adhesion to the metal substrate.

Emulsion-polymerization of the α,β-monoethylenically unsaturated monomer can be carried out by conventional emulsion-polymerization methods except that the above mentioned specific water-soluble polymer is used as the emulsifier and the catalyst is a water-soluble catalyst containing substantially no alkali metal ion which gives a bad influence (e.g. decrease of corrosion resistance and moisture resistance) onto the coating film.

For instance, the emulsion-polymerization may be carried out by adding dropwise simultaneously the α,β-monoethylenically unsaturated monomer and water (preferably a deionized water) containing an alkali metal-free water-soluble catalyst (e.g. ammonium persulfate) and optionally a part of the emulsifier from the separate dropping funnels to water (preferably a deionized water) containing all or the remaining part of the emulsifier which is kept at a temperature suitable for the reaction, and then reacting with agitation the mixture at a temperature of 50° to 70° C., preferably 55° to 65° C. The reaction period of time including the time for dropping the reactants is usually 3 to 7 hours.

The emulsifier is used in an amount of 20 parts by weight or more, preferably 20 to 50 parts by weight, in the solid content) to 100 parts by weight of the α,β-monoethylenically unsaturated monomer. When the amount of the emulsifier is less than 20 parts by weight, the emulsion has an inferior storage stability and hence cannot be used. The use of the emulsifier in excess of 50 parts by weight does not specifically provide an improvement to the storage of the emulsion or to its chemical stability to water-soluble chromium compounds but conversely causes problems such as the foaming of emulsion.

The above emulsion-polymerization can give an even and stable emulsion having about 30% by weight of solid content. When the emulsion is incorporated into the treating liquid, an epoxy resin such as a bisphenol type epoxy resin (e.g. Epicoat 828 and Epicoat 1001, trade name of Shell Chemical) may optionally be used together as a hardening agent. The epoxy resin may be incorporated in the preparation of the emulsion by dissolving it in the $\alpha,\beta$-monoethylenically unsaturated monomer and adding dropwise the mixture to the emulsion-polymerization system. The use of the epoxy resin can afford a coating film having superior paint adhesion properties.

The water-soluble chromium compound used in the present invention includes any conventional chromium compounds, but chromates are not necessarily preferable because the treating liquid should contain substantially no metallic ion or anionic ion which gives bad influence onto the corrosion resistance of the coating film. The most suitable example of the chromium compound is chromic anhydride ($CrO_3$). It is important that the chromium compound contain 30 to 90% by weight, preferably 40 to 60% by weight, of hexavalent chromium based on the total chromium content. When the content of the hexavalent chromium is less than 30% by weight, not only the corrosion resistance of the coated plate is lowered, but also the processing characteristics of the product in the forming step thereof is deteriorated. On the other hand, when the content of the hexavalent chromium is more than 90% by weight, the chromium compound tends to effuse out from the coating film, which results in inferior corrosion resistance and moisture resistance. Besides, the chromium other than hexavalent chromium in the chromium compound are predominantly a trivalent chromium. It is known that when the trivalent chromium is contained, the coating film shows more improved corrosion resistance and adhesion properties, but on the other hand, the stability of the treating liquid is unfavorably lowered. However, when the emulsion of the present invention is used, the desirably stable treating liquid can be obtained even if the trivalent chromium is contained. Besides, when the solution of the chromium compound is prepared, the hexavalent chromium is partially reduced to trivalent chromium by using a reducing agent such as formaldehyde, hydrogen peroxide, or the like.

The water-insoluble white carbon used in the present invention includes the following fine grain compounds:

(i) fine grain silicic acid anhydride, which has 98% by weight or more of $SiO_2$ content and contains little adhesive moisture and bound water, for example, a fumed silica prepared by a gaseous phase method (e.g. Aerosil, trade name of Degussa Co.; or Carb-O-Sil, trade name of Cabot Co.), a silica prepared by an arc method (e.g. Fransil, trade name of Fransol Co.; or ArcSilica, trade name of PPG Industries Inc.), (ii) fine grain silicic acid hydrate, which has 80 to 98% by weight of $SiO_2$ and contains a large amount of adhesive moisture and bound water, for example, a silica prepared by a wet process, i.e. by hydrolyzing a silicate with an acid and purifying the resulting silicic acid hydrate (e.g. Hi-Sil, trade name of PPG Industries Inc.; Ultrasil, trade name of Degussa Co.; Tokusil, trade name of Tokuyama Soda Co. Ltd. or Carplex, trade name of Shionogi Pharmaceutical Co.), and (iii) fine grain silicate, such as calcium silicate or aluminum silicate.

Among these, preferred white carbons are (a) a water-insoluble white carbon having the primary particles of 0.1 to $3\mu$ in particle size which is mostly present in the form of primary particles without aggregation in the treating liquid, and (b) a water-insoluble white carbon wherein the primary particles have large aggregation properties and the particles are present in the form of aggregated particles of 0.1 to $3\mu$ in particle size in the treating liquid.

The water-insoluble white carbon (a) includes the silicates mentioned above. Suitable examples of the aluminum silicates are Kaolin and calcined Kaolin (e.g. ASP #100–105, ASP #600, Satentone No. 1 or Satentone No. 3, trade name of Engelhardt Mineral & Chemicals Inc.). However, many silicates contain an alkali and shows an alkaline pH in the treating liquid, which is not suitable because the alkali ion or metal ion gives a bad influence on the moisture resistance of the coating film. Accordingly, it is preferable to use the silicate white carbon which shows a pH value of less than 7 when it is suspended in water in a concentration of about 5% by weight. Besides, there may also be used other water-insoluble silicates such as zirconium silicate, while they are usually not classified as a white carbon. Moreover, there may also be used the pulverized product of silica gel which is prepared by gelating silicic acid, for example, Syloid #244, #65 or #978 (trade name of Fuji-Davison Chemical Ltd.) or Silnex (trade name of Mizusawa Kagaku Kogyo K.K.).

The water-insoluble white carbon (b) includes a part of the silicic acid anhydrides and silicic acid hydrates. A suitable example of the fumed silica prepared by a gaseous phase method is Aerosil TT 600 (trade name of Degussa Co.) and suitable example of the silica prepared by the arc method is TK 800 (trade name of Degussa Co.), and a suitable example of the silicic acid hydrates is HK 125 (trade name of Degussa Co.). These white carbons are present in the form of aggregated secondary particles having a particle size in microns. The silica prepared by a wet process may also be used because it is present in the form of aggregated particles having a particle size in microns. The silica prepared by a wet process contains occasionally alkali ions in accordance with the process or the grade thereof, which gives a bad influence on the corrosion resistance and moisture resistance of the coating film. Accordingly, the suitable silica should show a pH value of less than 7 when it is suspended in water in a concentration of 5% by weight, for instance, the content of sodium ion should be less than 0.1% by weight in the whole silica.

The treating liquid may be prepared by mixing the emulsion and the water-soluble chromium compound in water (preferably a deionized water) in an appropriate concentration, and in the case when the water-insoluble white carbon is also incorporated, by dispersing well the water-insoluble white carbon into water (preferably a deionized water), admixing the dispersion with the emulsion and the water-soluble chromium compound, and optionally diluting the mixture with water (preferably a deionized water) so that the solid content is in an appropriate range, for example, about 0.5 to 10% by weight.

The emulsion and the water-soluble chromium compound are preferably admixed in the ratio of 100:1 to 1:10 by weight, more preferably 10:1 to 1:5 by weight, (in the solid content). When the mixed ratio of the water-soluble chromium compound is smaller than the above lower limit, the corrosion resistance of the coated plate is decreased, and the adhesion properties of the coating film onto the metal surface is also decreased. On the other hand, when the mixed ratio of the chromium compound is larger than the upper limit, the adhesion properties of the coated plate is unfavorably decreased.

The water-insoluble white carbon may preferably be admixed in the ratio of 10:1 to 1:10 by weight, more preferably 2:1 to 1:2 by weight, (the emulsion:the white carbon, in the solid content). When the mixed ratio of the white carbon is smaller than the lower limit, the adhesion properties and corrosion resistance of the coating film are not improved, and on the other hand, when it is larger than the upper limit, the moisture resistance of the coating film is deteriorated.

The treating liquid of the present invention may also be incorporated with some inorganic compounds which can release an inorganic ion other than an alkali metal ion, such as $Zn^{2+}$, $Co^{2+}$, $Ni^{2+}$, $Fe^{2+}$, $Fe^{3+}$, $PO_4^{3-}$, $F^-$, $BF_4^-$, $SiF_6^{2-}$, or the like. Incorporation of the inorganic ion-releasing compound can afford a more excellent, and even adhesion coating film onto the metal surface.

The treating liquid comprising the emulsion and the water-soluble chromium compound and optionally the water-insoluble white carbon is applied to the surface of metals (e.g. iron, galvanized steel, aluminum, etc.) by conventional methods such as roll coating, mist spraying or dipping and followed by drying thereof to form a coating film on the metal surface. The coating film is usually formed in an amount of 10 mg/m² to 5 g/m², preferably 50 mg/m² to 700 mg/m², in the dry state. When the coating film is formed in an amount out of the above range, the processability of the coated plate is liable to be deteriorated.

Drying of the coating film is carried out under the condition that the moisture included in the coating film can be removed but the resin is not molten, for instance, at a temperature of the metal plate of not higher than 120° C., preferably 80° to 110° C., for 1 second to 60 seconds. In practice, the metal to be dried is kept at an atmosphere of a little higher temperature than the above temperature of the metal plate. For instance, in case a treating liquid containing the solid content of 2 to 5% by weight is applied to the metal surface to form a coating film in an amount of 500 mg/m² to 1 g/m², the drying is carried out at an atmospheric temperature of 100° C. for 30 to 60 seconds or at an atmospheric temperature of 200° C. for 7 to 8 seconds. When the drying temperature is too high, the resin is molten and the coating film loses the rough surface, which results in deterioration of the adhesion properties and scratch resistance of the coating subsequently applied thereto.

Since the treating liquid of the present invention is incorporated with the emulsion prepared by using no surfactant and contains substantially no alkali metal ion, the coated plate shows excellent corrosion resistance, moisture resistance and further highly improved processability and adhesion properties such as scratch resistance.

According to the present invention, the maintenance of the treating liquid is not required and hence the formation of the coating film onto the metal surface can continuously be done merely by supplementing intermittently the consumed amount of the treating liquid having the same components as used first at a fixed period. Furthermore, since the steps of rinsing and other after-treatment are not required, the process can be shortened and further no specific apparatus for treating the waste water is required.

The present invention is illustrated by the following examples but is not limited thereto. In the examples, "part" and "%" mean "part by weight" and "% by weight", respectively, unless specified otherwise.

EXAMPLE 1

Into a flask provided with a stirrer, a reflux condenser, a thermometer and two dropping funnels, there are charged 150 parts of deionized water and 120 parts of water-soluble copolymer obtained by copolymerizing acrylic acid and 2-hydroxyethyl methacrylate in the ratio of 8:2 by weight (25% aqueous solution, molecular weight ($M\overline{w}$):66000), and the mixture is heated to 60°-65° C. with stirring. Then, a monomer mixture consisting of 35 parts of methyl methacrylate, 15 parts of styrene, 10 parts of 2-hydroxyethyl methacrylate and 40 parts of n-butyl acrylate and a catalyst solution consisting of 2 parts of ammonium persulfate and 50 parts of deionized water are separately and simultaneously added dropwise from the separate dropping funnels over a period of 8 hours. After completion of the dropwise addition, the resultant mixture is kept at 60° to 65° C. for about 2 hours to complete polymerization reaction to give an emulsion having 30.1% solid content.

Preparation of treating liquid 8.1 parts of the above emulsion, 7.4 parts of the aqueous solution of chromium compound (solid content: 16.5%) which is obtained by reducing about 50% of the amount of the hexavalent chromium to trivalent chromium by adding 5 parts of formalin (37% aqueous solution) to 95 parts of 17% aqueous solution of chromic anhydride and 20 parts of a dispersion (solid content 10%) of fine grain silicic acid anhydride (Aerosil TT 600, trade name of Degussa Co.) in deionized water are mixed at room temperature, to which deionized water is added to prepare a treating liquid having 2.3% solid content.

Metal Surface treatment and coating

The above treating liquid is applied with a roll coater to the surface of a galvanized steel (a plate having a thickness of 0.35 mm) degreased with an alkali degreasing agent ("RIDOLINE No. 72", trade name of Nippon Paint Co., Ltd.) and the resultant is immediately dried at 100° C. for 40 seconds to give an even coating film having a film weight of 293 mg/m². Thereafter, the thus surface-treated galvanized steel is coated with coating formulation for galvanized steel, i.e. with a primer formulation (Superlac DIF-TX-1, trade name of Nippon Paint Co., Ltd.) (baking: at a furnace temperature of 220° to 240° C. for 45 seconds, film thickness: 3μ) and then with a topcoating formulation (Superlac DIF-A-55, trade name of Nippon Paint Co., Ltd.) (baking: at a furnace temperature of 210° to 230° C. for 60 seconds, film thickness: 11μ) to give a coated plate.

REFERENCE EXAMPLE 1

Preparation of emulsion

Into the same flask as used in Example 1, there are charged 100 parts of deionized water and 7 parts of a nonionic surfactant (Emulgen 950, trade name of Kao Atlas Co.) and the mixture is kept to 60° to 65° C. with stirring. Then, the same monomer mixture as used in Example 1 and a catalyst solution consisting of 2 parts of ammonium persulfate and 20 parts of deionized water are separately and simultaneously added dropwise from the separate dropping funnels over a period of 3 hours. After completion of the dropwise addition, the resultant mixture is heated at 60° to 65° C. for about 1 hour to complete the polymerization reaction to give an emulsion having 46.3% solid content.

Preparation of treating liquid

To 5.3 parts of the above emulsion are added 7.4 parts of the same aqueous solution (solid content: 16.5%) of chromium compound as used in Example 1 and 20 parts of the same dispersion of white carbon (solid content: 10%) as used in Example 1, and thereto is added deionized water to give a treating liquid having 2.4% solid content.

Metal surface treatment and coating

In the same manner as described in Example 1 except that the treating liquid obtained above is used, there is obtained a coated plate (the film weight of the coating film: 305 mg/m²).

REFERENCE EXAMPLE 2

In the same manner as described in Reference Example 1 except that 5 parts of an anionic surfactant (Levenol WX, trade name of Kao Altas Co., 25% aqueous solution) are used instead of 7 parts of the nonionic surfactant, an emulsion (solid content: 45.5%) is obtained. 5.4 parts of the emulsion is admixed with 7.4 parts of the same aqueous solution of chromium compound (solid content: 16.5%) as used in Example 1 and 20 parts of the same dispersion of white carbon (solid content: 10%) as used in Example 1. As the result, the mixture is wholly instantaneously aggregated, and the supernatant liquid has a color of aqueous solution of chromium compound.

EXAMPLE 2

Preparation of treating liquid 8.1 parts of the emulsion prepared in Example 1 are admixed with 20 parts of the same aqueous solution of chromium compound (solid content: 16.5%) as used in Example 1 and 20 parts of a dispersion (solid content: 10%) of ultrafine grain silica gel (Silnex P-526, trade name of Mizusawa Kagaku Kogyo K.K.) in deionized water at room temperature, and thereto is added deionized water to give a treating liquid having 2.4% solid content.

Metal surface treatment and coating

In the same manner as described in Example 1 except that the treating liquid as obtained above is used, there is obtained a coating plate (the film weight of the coating film: 288 mg/m²).

EXAMPLE 3

Preparation of emulsion

In the same manner as described in Example 1 except that 200 parts of polyacrylic acid (25% aqueous solution, molecular weight ($M\bar{w}$): 59000) is used instead of 120 parts of acrylic acid/2-hydroxyethyl methacrylate copolymer and the monomer mixture consists of 35 parts of methyl methacrylate, 15 parts of styrene, 10 parts of ethyl methacrylate and 40 parts of n-butyl acrylate, the emulsion-polymerization is carried out to give an emulsion having 30.8% solid content.

Preparation of treating liquid 7.9 parts of the above emulsion are admixed with 7.4 parts of the same aqueous solution of chromium compound (solid content: 16.5%) as used in Example 1 and 20 parts of the same dispersion of white carbon (solid content: 10%) as used in Example 1 and thereto is added deionized water to give a treating liquid having 2.3% solid content.

Metal surface treatment and coating

In the same manner as described in Example 1 except that the above treating liquid is used, there is obtained a coated plate (the film weight of the coating film: 278 mg/m²).

EXAMPLE 4

Preparation of emulsion

In the same manner as described in Example 1 except that 120 parts of the polyacrylic acid as used in Example 3 is used instead of 120 parts of the acrylic acid/2-hydroxyethyl methacrylate copolymer, the emulsion-polymerization is carried out to give an emulsion having 29.4% solid content.

Preparation of treating liquid 5.1 parts of the above emulsion are admixed with 18 parts of an aqueous solution of chromium compound (solid content: 16.2%) which is prepared by reducing about 70% of the amount of hexavelent chromium to trivalent chromium by adding 7 parts of formalin (37% aqueous solution) to 95 parts of 17% chromic anhydride aqueous solution and 15 parts of the same dispersion of white carbon (solid content: 10%) as used in Example 1 at room temperature, and thereto is added deionized water to give a treating liquid having 2.4% solid content.

Metal surface treatment and coating

In the same manner as described in Example 1 except that the above treating liquid is used, there is obtained a coated plate (the film weight of the coating film: 308 mg/m²).

EXAMPLE 5

Preparation of emulsion

In the same manner as described in Example 1 except that 120 parts of a water-soluble copolymer (25% aqueous solution, molecular weight ($M\bar{w}$): 34000) which is prepared by copolymerizing acrylic acid and acrylamide in the ratio of 8:2 by weight is used instead of 120 parts of the acrylic acid/2-hydroxyethyl methacrylate copolymer, the emulsion-polymerization is carried out to give an emulsion having 31.5% solid content.

Preparation of treating liquid 5.1 parts of the above emulsion are admixed with 18 parts of the same aqueous solution of chromium compound (solid content: 16.5%) as used in Example 1 and 15 parts of a dispersion of fine grain silicic acid anhydride (Aerosil 200, trade name of Degussa Co.) in deionized water (solid content: 10%), and thereto is added deionized water to give a treating liquid having 3.1% solid content.

Metal surface treatment and coating

The above treating liquid is applied to a galvanized steel previously degreased as in Example 1 with a roll coater and the resultant is immediately dried at 100° C. for 60 seconds to form an even coating film (the film weight: 520 mg/m²). The thus surface-treated galvanized steel is coated with coating formulations for galvanized steel as in Example 1 to give a coated plate.

REFERENCE EXAMPLE 3

Preparation of treating liquid

In the same manner as described in Example 1 except that no chromium compound is incorporated, there is obtained a treating liquid having 2.3% solid content.

Metal surface treatment and coating

In the same manner as described in Example 1 except that the above treating liquid is used, there is obtained a coated plate (the film weight of the coating film: 280 mg/m$^2$).

REFERENCE EXAMPLE 4

Preparation of treating liquid

In the same manner as described in Example 1 except that no emulsion is incorporated, there is obtained a treating liquid having 2.3% solid content.

Metal surface treatment and coating

In the same manner as described in Example 1 except that the above treating liquid is used, there is obtained a coated plate (the film weight of the coating film: 303 mg/m$^2$).

REFERENCE EXAMPLE 5

Preparation of treating liquid

In the same manner as described in Example 1 except that 0.6 part of sodium hydroxide is additionally incorporated, there is obtained a treating liquid having 2.3% solid content.

Metal surface treatment and coating

In the same manner as described in Example 1 except that the above treating liquid is used, there is obtained a coated plate (the film weight of the coating film: 280 mg/m$^2$).

REFERENCE EXAMPLE 6

A commertially available zinc phosphate treating liquid for chemical conversion treatment is applied to a galvanized steel previously degreased as in Example 1 by a spray coating for 2 minutes. The resultant is immediately washed with a large amount of water, dipped in an aftertreating liquid, and then dried at 100° C. for 1 minute to form an even phosphate coating film (film weight: 1500 mg/m$^2$). The thus-treated galvanized steel is subjected to the coating finish as in Example 1 to give a coated plate.

The coated plates prepared in the above Examples and Reference Examples are subjected to the following tests. The results are shown in Table 1.

(1) Scratch resistance

The surface of the coated plate is scratched with a coin and the degree of the injure of the surface is observed. The results are evaluated as follows:

◎: Superior (not injured)
○: Good (little injured)
Δ: A little bad (injured)
X: Inferior (significantly injured)

(2) Bending resistance

The coated plate (width: 5 cm) is bent at an angle of 180° and vised, and a pressure-sensitive adhesive tape is adhered onto the bent surface and then is peeled off. The results are evaluated by 10 point method ranging from Point 10 (no trouble) to Point 1 (fully peeled off).

(3) Resistance to saline solution

A 5% saline solution is sprayed onto the coated plate which is scribed with a knife at 35°±1° C. for 1000 hours, and the width of blistered paint film from the scribe line is measured. The results are evaluated as follows:

Point 5: No trouble
Point 4: 0.5 mm>
Point 3: 0.5–1.5 mm
Point 2: 1.5–2.5 mm
Point 1: 2.5 mm<

(4) Moisture resistance

The coated plate is kept under the atmosphere of a humidity of 98±2% and a temperature of 50°±1° C. for 1000 hours, and then the blister density is measured (cf. ASTM D714-56). The results are evaluated as follows:

Point 5: No trouble
Point 4: Few
Point 3: Medium
Point 2: Medium dense
Point 1: Dense Table 1

| Test | Example No. | | | | | Reference Example No. | | | |
|---|---|---|---|---|---|---|---|---|---|
|  | 1 | 2 | 3 | 4 | 5 | 1 | 3 | 4 | 5 | 6 |
| Scratch resistance | ◎ | ◎ | ◎ | ◎ | ○ | X | Δ | ○ | ○ | ○ |
| Bending resistance | 10 | 10 | 10 | 10 | 10 | 4 | 6 | 8 | 8 | 8 |
| Resistance to saline solution | 5 | 5 | 5 | 4.5 | 5 | 1 | 1 | 4 | 2 | 4 |
| Moisture resistance | 5 | 5 | 5 | 5 | 5 | 1 | 1 | 2 | 1 | 4 |

EXAMPLE 6

Into a flask provided with a stirrer, a reflux condenser, a thermometer and two dropping funnels, there are charged 150 parts of deionized water and 120 parts of water-soluble copolymer obtained by copolymerizing acrylic acid and 2-hydroxyethyl methacrylate in the ratio of 8:2 by weight (25% aqueous solution, molecular weight (M$\bar{w}$): 66000), and the mixture is heated to 60°–65° C. with stirring. Then, a monomer mixture consisting of 35 parts of methyl methacrylate, 15 parts of styrene, 10 parts of 2-hydroxyethyl methacrylate and 40 parts of n-butyl acrylate and a catalyst solution consisting of 2 parts of ammonium persulfate and 50 parts of deionized water are separately and simultaneously added dropwise from the separate dropping funnels over a period of 8 hours. After completion of the dropwise addition, the resultant mixture is kept at 60° to 65° C. for about 2 hours to complete polymerization reaction to give an emulsion having 30.1% solid content.

Preparation of treating liquid 8.1 parts of the above emulsion and 7.4 parts of the aqueous solution of chromium compound (solid content: 16.5%) which is obtained by reducing about 50% of the amount of the hexavalent chromium to trivalent chromium by adding 5 parts of formalin (37% aqueous solution) to 95 parts of 17% aqueous solution of chromic anhydride are mixed at room temperature, to which deionized water is added to prepare a treating liquid having 2.3% solid content.

Metal surface treatment and coating

The above treating liquid is applied with a roll coater to the surface of a galvanized steel (a plate having a thickness of 0.35 mm) degreased with an alkali degreasing agent ("RIDOLINE No. 72", trade name of Nippon Paint Co., Ltd.) and the resultant is immediately dried at 100° C. for 40 seconds to give an even coating film having a film weight of 293 mg/m$^2$. Thereafter, the thus surface-treated galvanized steel is coated with coating formulation for galvanized steel (a melamine-alkyd resin formulation: Orga 100, trade name of Nippon Paint Co., Ltd.) (baking: at a furnace temperature of about 200° C. for 45 seconds, film thickness: about 8μ) to give a coated plate.

REFERENCE EXAMPLE 7

Preparation of emulsion

Into the same flask as used in Example 6, there are charged 100 parts of deionized water and 7 parts of a nonionic surfactant (Emulgen 950, trade name of Kao Atlas Co.) and the mixture is kept to 60° to 65° C. with stirring. Then, the same monomer mixture as used in Example 6 and a catalyst solution consisting of 2 parts of ammonium persulfate and 20 parts of deionized water are separately and simultaneously added dropwise from the separate dropping funnels over a period of 3 hours. After completion of the dropwise addition, the resultant mixture is heated at 60° to 65° C. for about 1 hour to complete the polymerization reaction to give an emulsion having 46.3% solid content.

Preparation of treating liquid

To 5.3 parts of the above emulsion are added 7.4 parts of the same aqueous solution (solid content: 16.5%) of chromium compound as used in Example 1, and thereto is added deionized water to give a treating liquid having 2.4% solid content.

Metal surface treatment and coating

In the same manner as described in Example 6 except that the treating liquid obtained above is used, there is obtained a coated plate (the film weight of the coating film: 305 mg/m$^2$).

EXAMPLE 7

Preparation of treating liquid 8.1 parts of the emulsion prepared in Example 6 are admixed with 6.7 parts of a mixture (solid content: 18.2%) of 100 parts of the same aqueous solution of chromium compound as used in Example 6 and 3 parts of phosphoric acid (75%) at room temperature, and thereto is added deionized water to give a treating liquid having 2.4% solid content.

Metal surface treatment and coating

In the same manner as described in Example 6 except that the treating liquid as obtained above is used, there is obtained a coating plate (the film weight of the coating film: 288 mg/m$^2$).

EXAMPLE 8

Preparation of emulsion

In the same manner as described in Example 6 except that 200 parts of polyacrylic acid (25% aqueous solution, molecular weight (Mw̄: 59000) is used instead of 120 parts of acrylic acid/2-hydroxyethyl methacrylate copolymer and the monomer mixture consists of 35 parts of methyl methacrylate, 15 parts of styrene, 10 parts of ethyl methacrylate and 40 parts of n-butyl acrylate, the emulsion-polymerization is carried out to give an emulsion having 30.8% solid content.

Preparation of treating liquid 7.9 parts of the above emulsion are admixed with 4.9 parts of the same aqueous solution of chromium compound (solid content: 16.5%) as used in Example 6 and thereto is added deionized water to give a treating liquid having 2.3% solid content.

Metal surface treatment and coating

In the same manner as described in Example 6 except that the above treating liquid is used, there is obtained a coated plate (the film weight of the coating film: 278 mg/m$^2$).

EXAMPLE 9

Preparation of emulsion

In the same manner as described in Example 1 except that 120 parts of the polyacrylic acid as used in Example 3 is used instead of 120 parts of the acrylic acid/2-hydroxyethyl methacrylate copolymer, the emulsion-polymerization is carried out to give an emulsion having 29.4% solid content.

Preparation of treating liquid 8.3 parts of the above emulsion are admixed with 5 parts of an aqueous solution of chromium compound (solid content: 16.2%) which is prepared by reducing about 70% of the amount of hexavelent chromium to trivalent chromium by adding 7 parts of formalin (37% aqueous solution) to 95 parts of 17% chromic anhydride aqueous solution at room temperature, and thereto is added deionized water to give a treating liquid having 2.4% solid content.

Metal surface treatment and coating

In the same manner as described in Example 6 except that the above treating liquid is used, there is obtained a coating plate (the film weight of the coating film: 308 mg/m$^2$).

EXAMPLE 10

Preparation of emulsion

In the same manner as described in Example 6 except that 120 parts of a water-soluble copolymer (25% aqueous solution, molecular weight (Mw̄): 34000) which is prepared by copolymerizing acrylic acid and acrylamide in the ratio of 8:2 by weight is used instead of 120 parts of the acrylic acid/2-hydroxyethyl methacrylate copolymer, the emulsion-polymerization is carried out to give an emulsion having 31.5% solid content.

Preparation of treating liquid 7.7 parts of the above emulsion are admixed with 4.9 parts of the same aqueous solution of chromium compound (solid content: 16.5%) as used in Example 6 and thereto is added deionized water to give a treating liquid having 3.1% solid content.

Metal surface treatment and coating

The above treating liquid is applied to a galvanized steel previously degreased as in Example 6 with a roll coater and the resultant is immediately dried at 100° C. for 60 seconds to form an even coating film (the film weight: 520 mg/m$^2$). The thus surface-treated galvanized steel is coated with coating formulation for galvanized steel as in Example 6 to give a coated plate.

The coated plates prepared in the above Examples 6 to 10 and Reference Example 7 are subjected to the following tests. The results are shown in Table 2.

(1) Scratch resistance

The surface of the coated plate is scratched with a coin and the degree of the injure of the surface is observed. The results are evaluated as follows:

○ : Good (little injured)

Δ: A little bad (injured)

X: Inferior (significantly injured)

(2) Bending resistance

The coated plate (width: 5 cm) is bent at an angle of 180°, between which two plates having the same thickness as that of the plate to be tested are inserted, and vised, and a pressure-sensitive adhesive tape is adhered onto the bent surface and then is peeled off. The results are evaluated by 10 point method ranging from Point 10 (no trouble) to Point 1 (fully peeled off).

(3) Resistance to saline solution

A 5% saline solution is sprayed onto the coated plate which is scribed with a knife at 35°±1° C. for 1000 hours, and the width of blistered paint film from the scribe line is measured. The results are evaluated as follows:

Point 5: No trouble
Point 4: 0.5 mm >
Point 3: 0.5–1.5 mm
Point 2: 1.5–2.5 mm
Point 1: 2.5 mm <

(4) Moisture resistance

The coated plate is kept under the atmosphere of a humidity of 98±2% and a temperature of 50°±1° C. for 1000 hours, and then the blister density is measured (cf. ASTM D714-56). The results are evaluated as follows:

Point 5: No trouble
Point 4: Few
Point 3: Medium
Point 2: Medium dense
Point 1: Dense Table 2

| Test | Example No. 6 | 7 | 8 | 9 | 10 | Ref. Ex. 7 |
|---|---|---|---|---|---|---|
| Scratch resistance | ○ | ○ | ○ | ○ | ○ | X |
| Bending resistance | 8 | 9 | 10 | 9 | 8 | 4 |
| Resistance to saline solution | 5 | 5 | 5 | 5 | 5 | 1 |
| Moisture resistance | 5 | 5 | 5 | 5 | 5 | 1 |

What is claimed is:

1. A method for the treatment of a metal surface for the purpose of preparing it to receive a coating finish, which comprises applying a treating liquid consisting essentially of an emulsion and a water-soluble chromium compound containing 30 to 90% by weight of hexavalent chromium to a metal surface and drying the resultant, said treating liquid containing substantially no alkali metal ion, said emulsion being prepared by emulsion-polymerizing an α,β-monoethylenically unsaturated monomer selected from the group consisting of an acrylic ester, a methacrylic ester, acrylonitrile, methacrylonitrile and styrene in the presence of a polymer selected from the group consisting of a polyacrylic acid and a copolymer of acrylic acid and a monomer selected from the group consisting of methacrylic acid, acrylamide, N-methylolacrylamide, methacrylamide, N-methylolmethacrylamide, 2-hydroxyethyl acrylate, hydroxypropyl acrylate, 2-hydroxyethylmethacrylate, hydroxypropyl methacrylate, 3-hydroxybutylacrylate, 2,2-bis(hydroxymethyl)ethyl acrylate, 2,3-dihydroxypropyl methacrylate, 3-hydroxybutyl methacrylate, and mono(2-hydroxyethyl methacrylate) acid phosphate, said polymer being used in an amount of 20 parts by weight or more in respect to the solid content, 100 parts by weight of the α,β-monoethylenically unsaturated monomer.

2. The method according to claim 1, wherein the mixed ratio of the emulsion and the water-soluble chromium compound is in the range of 100:1 to 1:10 by weight (in the solid content).

3. The method according to claim 1, wherein the chromium compound contains 40 to 60% by weight of hexavalent chromium.

4. The method according to claim 1, wherein the emulsifier is a polyacrylic acid.

5. The method according to claim 1, wherein the emulsifier is a water-soluble acrylic acid/acrylamide copolymer.

6. The method according to claim 1, wherein the emulsifier is a water-soluble acrylic acid/methacrylamide copolymer.

7. The method according to claim 1, wherein the emulsifier is a water-soluble acrylic acid/2-hydroxyethyl methacrylate copolymer.

8. The method according to claim 1, wherein the emulsifier is a water-soluble acrylic acid/mono(2-hydroxyethyl methacrylate)acid phosphate copolymer.

9. The method according to claim 1, wherein the emulsifier is a water-soluble acrylic acid/2-hydroxyethyl methacrylate/mono(2-hydroxyethyl methacrylate)acid phosphate copolymer.

10. The method according to claim 1, hwerein the emulsifier is a water-soluble acrylic acid/methacrylic acid copolymer.

11. The method according to claim 1, wherein the treating liquid comprises the emulsion and the water-soluble chromium compound and a silicic compound selected from the group consisting of silicic acid anhydride and silicic acid hydrate.

12. The method according to claim 11, wherein the water-insoluble white carbon is incorporated in the ratio of 10:1 to 1:10 by weight (in the solid content) (the emulsion: the white carbon).

13. The method of claim 11, wherein the silicic compound is present in such amounts that the weight ratio of the emulsion to the silicic compound is 10:1 to 1:10.

14. The method according to claim 1, wherein the drying is carried out at a temperature of the metal plate of not higher than 120° C.

* * * * *